United States Patent [19]
Niehaus

[11] 3,751,635
[45] Aug. 7, 1973

[54] TEMPERATURE CONTROL CIRCUIT

[76] Inventor: Wolfgang Niehaus, Sandheide 15, 2104 Hamburg 92, Germany

[22] Filed: Feb. 22, 1972

[21] Appl. No.: 228,132

[30] Foreign Application Priority Data
Feb. 20, 1971 Germany................... P 21 08 218.8

[52] U.S. Cl.............................. 219/499, 219/497
[51] Int. Cl. ............................................. H05b 1/02
[58] Field of Search................... 219/494, 497, 499, 219/501

[56] References Cited
UNITED STATES PATENTS
3,381,226  4/1968  Jones et al...................... 219/501 X
3,475,593  10/1969  Olofsson et al..................... 219/501
3,646,577  2/1972  Ernst.............................. 219/499 X Primary Examiner—Bernard A. Gilheany
Assistant Examiner—F. E. Bell
Attorney—Frank R. Trifari

[57] ABSTRACT

The invention relates to a temperature control circuit for a device, such as an oven, a cooker or a washing machine, including a triac which is controlled by a temperature sensor connected in a bridge circuit, a second bridge circuit and an amplifier stage being provided by means of which three-stage control is obtained and the triac is always controlled during the passages through zero of the supply voltage. When the temperature is too high no power is supplied to a heating element, when the temperature is too low the full power is supplied, and near the desired temperature one half of the power is supplied.

8 Claims, 5 Drawing Figures

TEMPERATURE CONTROL CIRCUIT

The invention relates to a temperature control circuit for controlling the temperature of a device which includes a heating element, which element is to be connected in series with a bidirectional triode thyristor, generally referred to as a triac, to an alternating-voltage supply,. The the input terminals for this supply are connected a passage-through-zero detection circuit and a supply circuit which comprises a rectifier diode, a series resistor and a smoothing capacitor for supplying a measuring bridge circuit and a firing circuit. The measuring bridge circuit comprises a temperature sensor and the base-emitter circuit of a transistor as an unbalance detector, while the firing circuit is connected to the control electrode of the triac so that, when the temperature of the device is too low, the passage-through-zero detection circuit in conjunction with the output collector circuit of the unbalance detector causes the firing circuit to deliver a trigger signal in the region of the passages through zero of the alternating voltage of the supply so as to fire the triac.

Such a circuit is described in U.S. Pat. No. 3,381,226. This known circuit is intended to provide on-off control and has the disadvantage that always the full power is switched on or switched off, and when the desired powers or temperatures are to be held within close tolerances the current is switched on and off at a very high rate. However, this gives rise to power supply disturbances, which when, for example, the circuit includes lamps show themselves as brightness fluctuations.

This disadvantage may be obviated by switching the supplied power on and off gradually, but this is an expensive solution.

It is an object of the present invention to provide a regulating or control circuit in which the load fluctuations due to the periodic switching on and off of the full load are eliminated and which moreover enables the control or regulating accuracy to be increased.

The invention is characterized in that during the trigger signal the firing circuit derives a current from the smoothing capacitor of a value such that the voltage across this capacitor is appreciably decreased, resulting in three-point regulation of the temperature, the triac being blocked when the temperature is too high, whereas when the temperature is too low the collector current of the unbalance detector is large enough to fire the triac via the firing circuit at each passage through zero, and, as the third possibility, in the proximity of the set temperature the triac passes current only during that half-cycle of the alternating voltage which succeeds the half-cycle during which the rectifier diode charges the smoothing capacitor to the maximum supply voltage, and the unbalance voltage of the measuring bridge circuit, using the exponential base-emitter versus collector current characteristic, produces in the unbalance detector a collector current still sufficient for the firing circuit to fire the triac.

This provides the advantage that in accordance with the deviation of the actual value from the desired value there is supplied to the load either no power or one half of the power or the full power, with the result that the desired value is maintained more accurately. In addition, switching during the passage through zero of the current has the advantage that the load variations in the power supply are not effected abruptly but gradually.

The invention utilizes the property of a triac of firing only if a trigger signal of sufficient amplitude is applied to the control electrode, while furthermore use is made of the discharge of the smoothing capacitor due to the trigger signal so that in the succeeding half-cycle a lower measuring-bridge voltage is available, the unbalance voltage is proportionally decreased and, owing to the exponential characteristic of the base-emitter voltage plotted against the collector current provides a comparatively reduced collector current in the succeeding passage through zero. In the desired small temperature range the collector current may be insufficient to trigger the triac via the firing circuit.

An embodiment of the invention will now be described, by way of example, with reference to the accompanying diagrammatic drawings, in which.

Figure 1:
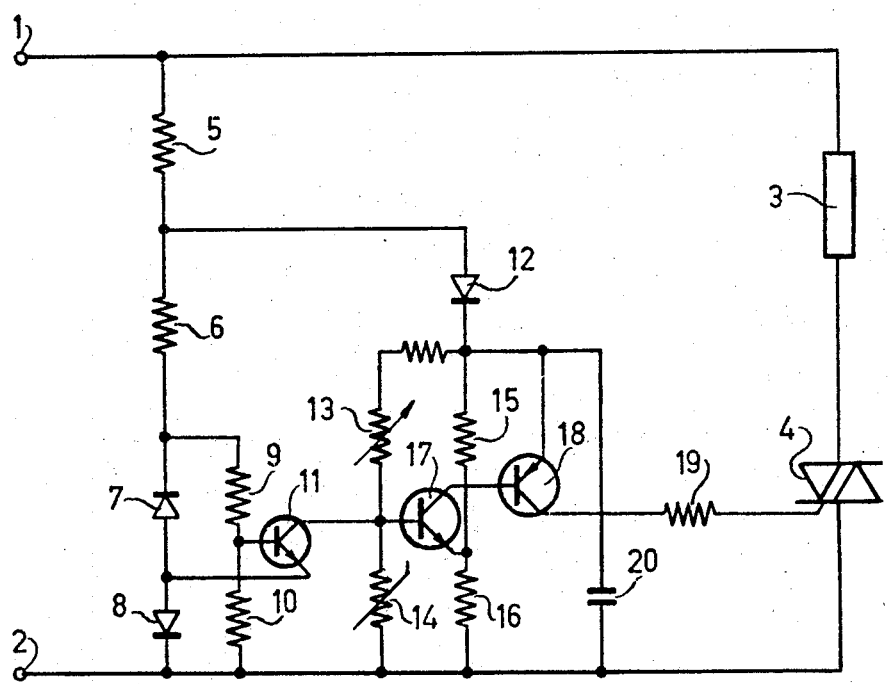
FIG. 1 is a circuit diagram of an embodiment of the circuit.

Referring now to FIG. 1, electrical energy is supplied from terminals 1 and 2 of an alternating-current power supply to a load 3 through a triac 4. A series combination of two resistors 5 and 6 and two in series opposition connected diodes 7 and 8 shunted by two further resistors 9 and 10 is connected in parallel with the terminals 1 and 2. The junction point of the two diodes 7 and 8 is connected to the emitter of a first transistor 11 to the base of which is connected the junction point of the two resistors 9 and 10. From the junction point of resistors 5 and 6 a voltage is derived which is rectified by a rectifying diode 12 and is supplied to a bridge circuit comprising resistors 13, 14, 15 and 16. The resistor 13 is variable and the resistor 14 is a temperature sensor, for example, a NTC resistor. The opposite points of this bridge circuit are interconnected through the emitter base path of a second transistor 17, the base of this transistor being also connected to the collector of the first transistor 11. The collector of the second transistor 17 is connected to the base of a third transistor 18 of the opposite conductivity type, the collector of which is connected to the control electrode of the triac 4 via a resistor 19. The emitter of the third transistor 18 is connected to the supply point of the bridge circuit and also, via a capacitor 20, to the terminal 2.

As long as the bridge circuit comprising the resistors 13, 14, 15 and 16 is balanced, or as long as the ratio between the value of the NTC resistor 14 and the set value of the variable resistor 13 is less than the ratio between the values of the resistors 15 and 16, the second transistor 17 is cut off. However, when the value of the NTC resistor is higher, i.e. when the desired temperature has not yet been reached, the transistor 17 becomes conducting at every passage through zero of the current and carries current via the base of the third transistor 18. Thus this transistor 18 supplies a current which is increased by its amplification factor via the resistor 19 to the trigger electrode of the triac 4. This sets the triac 4 to the conducting state. In contrast with known triac circuits a trigger current must only be supplied to the triac during the passages through zero of the current.

This is achieved by inserting into the input the bridge circuit which comprises the diodes 7 and 8 and the resistors 9 and 10. The transistor 11 becomes conducting when an accurately defined voltage which differs from zero either in the positive or in the negative sense is set up at the opposite points of this bridge circuit. This changes the setting of the bridge circuit 7,8,9 and 10 to an extent such that the second transistor 17 is cut off when the voltage at the input terminals differs from zero. Because the change in the setting of this bridge is effected by means of the transistor 11 symmetrically with respect to the passage through zero of the input voltage, a firing current is supplied to the triac 4 before the current in the load circuit falls below the holding current of the triac 4. This prevents the triac 4 from being extinguished owing to the current dropping below the holding-current value. Also the interference pulses which would occur because of the extinction of the triac at other instants than the passage through zero are suppressed.

Figure 2A:
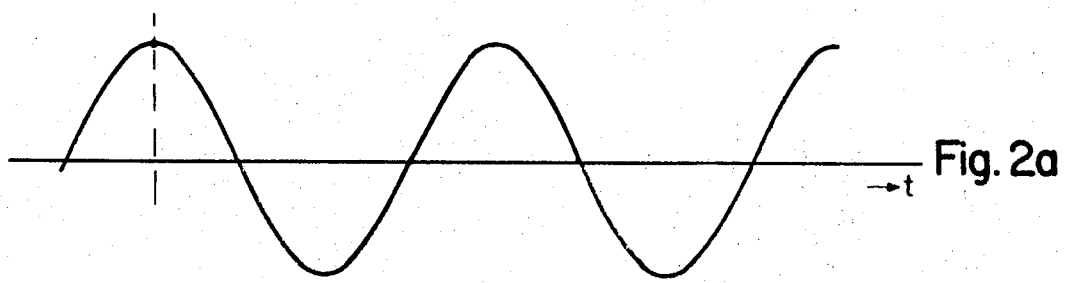
FIGS. 2a–2d shows voltage and current waveforms.
Figure 2B:
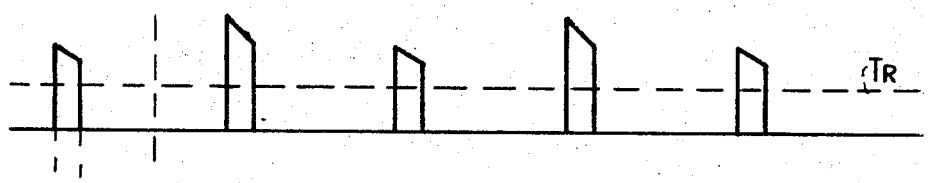

FIG. 2a shows the variation of the voltage at the terminals 1 and 2 in the form of a sine function. FIG. 2b shows the firing current which flows through the resistor 19 when the temperature of the device is much too low. The amplitudes alternately have high and low values, but even the low values still exceed the trigger level Tr of the triac.

Figure 2C:
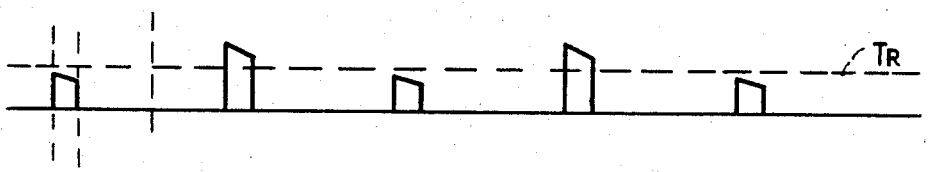
Figure 2D:
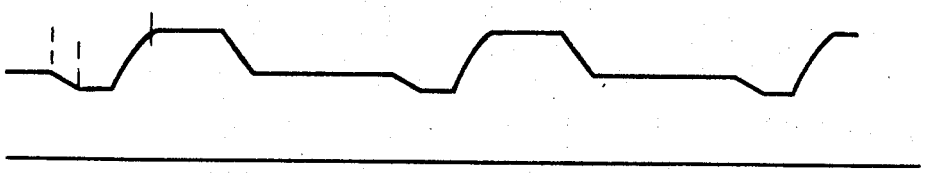

In FIG. 2c the desired temperature has almost been reached. Only the pulses which succeed a positive half-cycle of the alternating voltage exceed the trigger level Tr, so that only the negative half-cycles act upon the load via the triac. FIG. 2d shows the variation of the voltage across the smoothing capacitor which reaches a maximum value during each positive half-cycle.

When the bridge circuit 13, 14, 15, 16 approaches the balanced condition because the desired temperature has almost been reached, the voltage difference between the two arms of the bridge circuit progressively decreases, i.e. the absolute value of this difference becomes dependent upon the value of the charging voltage which at this instant is set up across the smoothing capacitor 20. When the desired temperature is approached to within a given extent, which may be influenced by means of the capacitance value of the capacitor 20 and the current drawn by the transistor 18, the amplitude of the firing pulses for the triac 4 will be too small at the beginning of each positive half-cycle, because the voltage difference of the unbalanced bridge circuit is no longer sufficient to further drive the transistor 17 owing to the greatly reduced bridge voltage and also owing to the exponential characteristic of the base-emitter voltage versus collector current. As a result the triac is fired at each negative half-cycle only. Thus, only half of the heating power is supplied to the load resistor 3. When the temperature continues to rise the bridge circuit 13, 14, 15, 16 will reach the balanced condition, with the result that the firing pulses for the negative half-cycles also are suppressed. This means that from this instant no power is supplied to the load resistor 3. When subsequently the temperature falls again, at first only the negative half-cycles are passed. When the temperature continues to drop, the positive half-cycles will also be passed, as has been explained hereinbefore. Thus a three-stage control is obtained.

What is claimed is:

1. A temperature control circuit for providing three-point temperature regulation of a device which includes a heating element comprising, a pair of input terminals adapted to be connected to a source of AC supply voltage, bidirectional controlled switching means connecting said heating element to said input terminals to control the flow of current from said terminals to said heating element, a zero crossing voltage detection circuit connected to the input terminals, a transistor unbalance detector, a measuring bridge circuit including a temperature sensor in one arm and the base-emitter circuit of said transistor unbalance detector, a firing circuit controlled by the output collector circuit of the unbalance detector of the bridge circuit and including means for applying a trigger signal to a control electrode of said bidirectional switching means, a supply circuit including a diode and a capacitor for coupling energy from the input terminals to the bridge circuit and the firing circuit, said zero crossing detection circuit being operative, when the temperature of the device is too low, in conjunction with the output collector circuit of the unbalance detector to signal the firing circuit to deliver a trigger signal to fire the switching means in the zero value region of the AC supply voltage, means including the firing circuit for discharging an appreciable portion of the capacitor charge at the time the trigger signal is generated, said bridge and firing circuits being arranged so as not to supply a trigger signal when the temperature of the device is above the desired set temperature, and said bridge and firing circuits and said capacitor being operative with the zero detection circuit in the proximity of the set temperature of the device to trigger the switching means during alternate half cycles of the AC supply voltage.

2. A temperature control circuit as claimed in claim 1 wherein said zero crossing detection circuit comprises a bridge circuit have a second transistor unbalance detector the emitter of which is connected to the junction point of two diodes connected in series opposition which each form an arm of the bridge circuit, means connecting the base of the transistor to the junction point of two resistors which may be in the form of diodes and each form another bridge arm, the collector of the said transistor being arranged to pass current outside the zero value region of the alternating voltage, the temperature control circuit further including a common lead to which are connected one input terminal for the alternating voltage supply, a supply point of the bridge circuit comprising the zero detection circuit, a supply point of the measuring bridge circuit, one terminal of the capacitor and one main electrode of the switching means, and wherein the firing circuit includes a transistor the emitter of which is connected to the other terminal of the capacitor, the collector of which is connected via a resistor to the control electrode of the switching means and the base of which is connected to the collector of the measuring bridge unbalance detector, and means connecting the collector of the second transistor unbalance detector to the base of the measuring bridge unbalance detector.

3. A temperature control circuit as claimed in claim 2, wherein the other bridge supply point of the zero crossing detection circuit is connected via the series combination of two resistors to the other input terminal of the alternating voltage supply, the supply circuit diode being connected between the junction point of said two series-connected resistors and the other bridge supply point of the measuring bridge circuit.

4. A temperature control circuit as claimed in claim 1 wherein said diode is connected between one of said input terminals and one input terminal of the measuring bridge and the capacitor is connected across the input terminals of the measuring bridge circuit.

5. A temperature control circuit as claimed in claim 4 wherein the base-emitter circuit of the transistor unbalance detector is connected across the output terminals of the measuring bridge circuit and said firing circuit includes a transistor with its base connected to the collector of the transistor unbalance detector and its collector connected to the control electrode of the switching means.

6. A temperature control circuit as claimed in claim 1 wherein said zero crossing detection circuit comprises a second bridge circuit with input terminals connected to the AC supply terminals and first and second diodes connected in series opposition between the bridge input terminals to form first and second arms of the bridge and first and second impedance elements serially connected between the bridge input terminals to form third and fourth arms of the bridge, and a second transistor unbalance detector with its base-emitter circuit connected to the output terminals of the second bridge circuit and its collector connected to the base of the first transistor unbalance detector.

7. A temperature control circuit as claimed in claim 6 wherein said supply circuit includes two resistors connected in series between one of said supply terminals and one input terminal of the second bridge circuit, said supply circuit further comprising means connecting the supply diode between the junction of said two series connected resistors and an input terminal of the measuring bridge circuit.

8. A temperature control circuit as claimed in claim 1 wherein said firing circuit comprises a transistor with its base connected to the collector of the transistor unbalance detector and its emitter-collector circuit connected to provide a discharge path for the capacitor into the control electrode of said switching means, and said switching means comprises a semiconductor triac.

* * * * *

UNITED STATES PATENT AND TRADEMARK OFFICE
CERTIFICATE OF CORRECTION

PATENT NO. : 3,751,635
DATED : August 7, 1973
INVENTOR(S) : WOLFGANG NIEHAUS

It is certified that error appears in the above-identified patent and that said Letters Patent are hereby corrected as shown below:

Claim 2, line 30, before "bridge" insert -- second --;

line 33, before "bridge" insert -- second --;

line 42, before "bridge" insert -- second --;

Claim 6, line 15, before "bridge" insert -- second --;

line 17, before "bridge" insert -- second --;

Signed and Sealed this

Twelfth Day of October 1976

[SEAL]

Attest:

RUTH C. MASON
*Attesting Officer*

C. MARSHALL DANN
*Commissioner of Patents and Trademarks*